United States Patent [19]
Skelley

[11] 3,818,779
[45] June 25, 1974

[54] MANUAL TRANSMISSION SHIFT CONTROL

[76] Inventor: John W. Skelley, 923 Canterbury St., Saginaw, Mich. 48603

[22] Filed: May 3, 1973

[21] Appl. No.: 356,725

[52] U.S. Cl............. 74/473 R, 74/473 SW, 74/487
[51] Int. Cl............................................. G05g 9/12
[58] Field of Search......... 74/473 SW, 473 P, 473 R, 74/471 R, 470, 487, 486, 485, 484

[56] References Cited
UNITED STATES PATENTS

| | | | |
|---|---|---|---|
| 3,543,600 | 12/1970 | Wight et al. | 74/473 SW |
| 3,600,966 | 8/1971 | Anderson | 74/473 SW |
| 3,732,747 | 5/1973 | Piziks | 74/487 |

Primary Examiner—Samuel Scott
Assistant Examiner—F. D. Shoemaker
Attorney, Agent, or Firm—John P. Moran

[57] ABSTRACT

A manual transmission shift control system wherein rotational and axial selector lever shift movements through a typical "H" pattern are respectively transmitted by a shift tube with a single lower shift lever and by a cable to a relay lever mounted on the transmission side cover, to cause the relay lever to alternately cooperate with R-1 and 2-3 levers for selecting desired transmission drive ratios.

5 Claims, 8 Drawing Figures

PATENTED JUN 25 1974　　　　　　　　　　　　　　　　　3,818,779

MANUAL TRANSMISSION SHIFT CONTROL

This invention relates generally to manual transmissions and, more particularly, to a transmission shift control system therefor.

Heretofore it has been common practice in manual transmission applications to utilize a steering column wherein the shift tube is both rotationally and axially movable in response to movements of the selector lever through the typical "H" pattern. Depending upon the axial position of the shift tube, rotational movement thereof actuates one or the other of two lower column shift levers, each appropriately interconnected with the transmission to select the R-1 and 2-3 drive ratios.

A general object of the inveniton is to provide a simplified vehicular steering column arrangement, wherein the shift tube is rotatable only and incorporates only a single lower shift lever.

Another object of the invention is to provide an improved transmission shift control system wherein only manual rotational movement is transmitted from the selector lever to the shift tube via the shift bowl, and manual axial movement of the selector lever is transmitted independently of the shift tube via a cable.

A further object of the invention is to provide a manual transmission shift control system wherein the relay lever associated with the transmission is positioned axially be a cable extending from the selector lever and then is rotated by manual rotation of the shift bowl and shift tube to rotate one or the other of adjacent R-1 and 2-3 levers, depending upon the selected axial position of the relay lever.

These and other objects and advantages of the invention will be apparent when reference is made to the following description and accompanying drawings, wherein.

Figure 1:
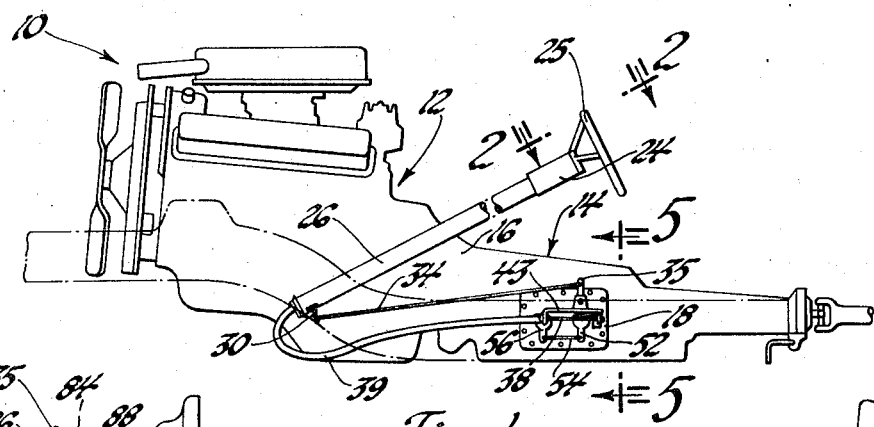
FIG. 1 is a side elevational view of a vehicular engine, transmission, and steering column assembly embodying the invention.

Referring now to the drawings in greater detail, FIG. 1 illustrates a vehicular power train 10 including an engine 12 and a manual three-speed and reverse transmission 14, the latter having a housing 16 and a cover plate or side cover 18.

Figure 2:
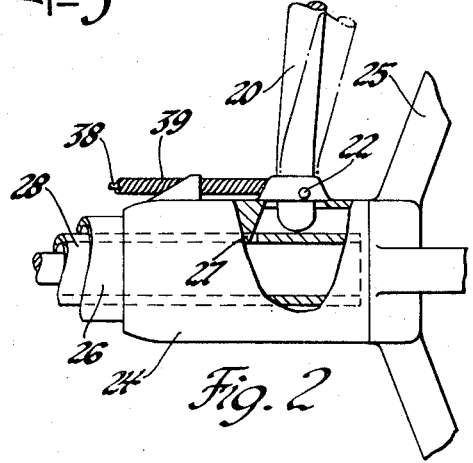
FIG. 2 is an enlarged fragmentary cross-sectional view taken along the plane of line 2—2 of FIG. 1, and looking in the direction of the arrows.

As seen in FIG. 2, a manual selector lever 20 is pivotally mounted on a pin 22 on a shift bowl or shroud 24 is latter being positioned adjacent the steering wheel 25 around a fixed steering column jacket 26. The shift bowl 24 is splined or otherwise secured (as at 27) to the upper end of the shift tube 28 for rotation therewith in a manner similar to that of conventional steering columns as used with automatic transmissions, there being no axial movement of the shift tube 28 involved, as would be the case for a steering column associated with a manual transmission.

Figure 5:
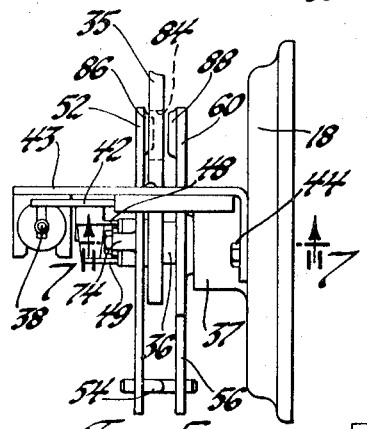
FIGS. 5 and 6 are end views of different operational positions of a portion of the invention, FIG. 5 being taken along the plane of line 5—5 of FIG. 1, and looking in the direction of the arrows.
Figure 3:
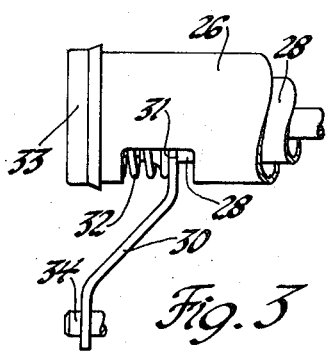
FIG. 3 is an enlarged fragmentary view of the lower portion of the steering cloumn arrangement of FIG. 1.

A shift lever 30 is mounted around the lower end (FIG. 3) of the shift tube 28 for rotation therewith and retained axially against a shoulder 31 thereof by a spring 32 mounted around the end portion of the shift tube 28 between the shift lever 30 and an end-cap 33. A linkage member 34 serves to connect the shift lever 30 to a relay lever 35, the latter being axially movably mounted around a sleeve shaft extension 36 (FIG. 5) rotatably connected to a boss 37 formed on the cover plate 18, as will be explained in greater detail with respect to FIG. 7.

A cable 38, running through a sheath 39 is connected between a point on the selector lever 20 a predetermined distance outboard of the pivot pin 22 and a connector flange 40 formed on a bellcrank member 42. The end of the sheath 39 is rigidly supported on a suitable bracket 43 secured to the cover plate 18 by bolts 44. The bellcrank member 42 is pivotally mounted at a support flange 45 thereof (FIG. 8) on a fixed pivot pin 46 secured to the bracket 43, the flanges 40 and 45 being oppositely disposed on the same end of the bellcrank member 42. A pair of oppositely disposed tabs 48 and 49 (FIGS. 4 and 5), formed on the other end of the bellcrank member 42, extend through two arcuate slots 50 and 51, respectively (FIG. 4), formed in a lever 52 pivotally mounted with respect to the sleeve shaft 36 adjacent the axially movable relay lever 35, as will be explained.

A linkage member 54 connects between the lower end of the lever 52 and an end of a 2-3 lever 56 secured by a bolt 57 (FIG. 4) to a shaft 58 extending through the side cover 18 from the transmission 14.

Figure 7:
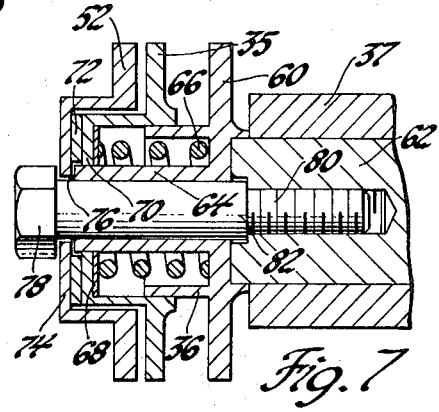
FIG. 7 is a fragmentary cross-sectional view taken along the plane of line 7—7 of FIG. 5, and looking in the direction of the arrows.

Referring now to FIG. 7, it may be noted that an R-1 lever 60 is secured in any suitable manner, such as by press-fitting, to a shaft 62 extending through the boss 37 from the transmission 14. The sleeve shaft 36 is formed on the outer face of the lever 60, as is an inner concentric longer sleeve shaft 64. A spring 66 is mounted radially between the sleeve shafts 36 and 64, and axially between the lever 60 and a bearing member 68 adjacent an inwardly extending flange 70 formed on the relay lever 35. A second bearing member 72 is mounted around the end portion of the sleeve shaft 64, intermediate the flange 70 and a flange member 74 formed on the lever 52. The latter is free to rotate independently of the R-1 lever 60 by virtue of being axially retained but not confined between the end face 76 of the sleeve shaft 64 and the head 78 of a bolt 80, the bolt 80 extending through a sleeve member 82 mounted within the sleeve shaft 64 into the shaft 62.

Figure 6:
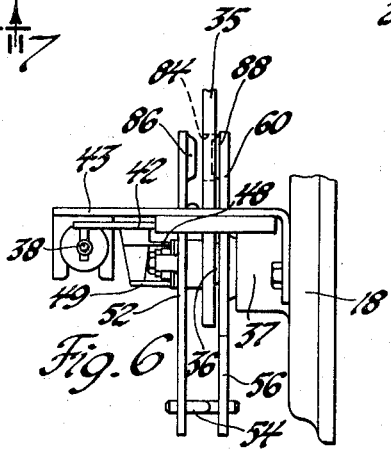

A slot 84 is formed in the relay lever 35 a predetermined distance from the axis of the shaft 62 so as to be alternately axially movable into contact with projections 86 and 88 formed on adjacent sides of the levers 52 and 60, respectively. The spring 66 urges the relay lever 35 away from the R-1 lever 60 and the cover plate 18 and retains the slot 84 of the relay lever 35 in contact with the projection 86 (FIG. 5) until such time as the relay lever 35 is moved axially into the position illustrated in FIG. 6, as will be explained.

OPERATION

In operation, rotational movement of the selector lever 20 through the parallel legs of the typical "H" reverse-first (R–1) or second-third (2–3) ratio pattern is transmitted via the shift tube 28, the shift lever 30, and the linkage member 34 to the relay lever 35, while axial cross-shift or Neutral movement across the center portion of the "H" pattern is transmitted to the relay lever 35 via the cable 38 extending from the selector lever 20 to the bellcrank member 42.

Figure 8:
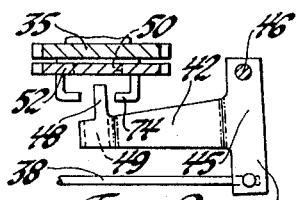
FIG. 8 is a cross-sectional view taken along the line 8—8 of FIG. 4, and looking in the direction of the arrows.
Figure 4:
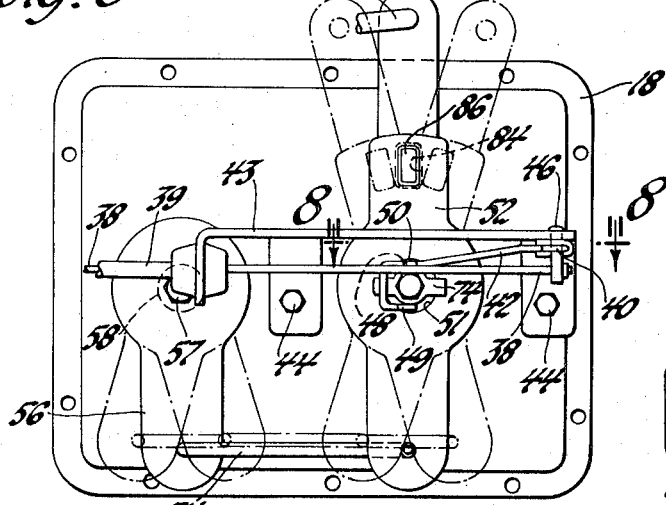
FIG. 4 is an enlarged view of the transmission side cover shown in FIG. 1.

It may be realized from FIGS. 4 and 8 that movement of the cable 38 across the "H" pivots the bellcrank member 42 about the pivot pin 46 to cause the two oppositely disposed tabs 48 and 49 formed on the end thereof to either press against the relay lever 35 through the two arcuate slots 50 and 51 formed in the lever 52, and move the relay lever 35 toward the transmission side cover 18, against the force of the spring 66 to the R–1 axial position against the R–1 lever 60, or to retract from the relay lever 35, allowing the relay lever 35 to be urged by the spring 66 to its normal 2–3 axial position against the lever 52.

While in the R–1 axial position, it may be noted that the slot 84 of the relay lever 35 connects with the projection 88 formed on the R–1 lever 60, such that any rotary movement of the selector lever 20 and, hence, of the shift tube 28, will correspondingly rotate the lever 60 via the lever 30, the linkage member 34 and the relay lever 35 for selection of one of the FIRST or REVERSE gear ratios, as desired.

While in the 2–3 axial position, it may be noted that the slot 84 of the relay lever 35 connects with the projection 86 formed on the lever 52, such that any rotary movement of the selector lever 20 and, hence, of the shift tube 28 will rotate the associated lever 52 via the lever 30, the linkage member 34, and the relay lever 35. Rotation of the lever 52, in turn, actuates the linkage member 54 to thus rotate the 2–3 lever 56 and the shaft 58 extending through the side cover 18 for selection of one of the SECOND or THIRD gear ratios, as desired.

It should be apparent that the invention provides an improved simplified shift control arrangement wherein an interconnected shift bowl and shift tube need only be rotated by a selector lever pivotally mounted on the shift bowl, while axial movement of the selector lever is transmitted to control members mounted on the transmission via a cable connected to the selector lever radially outward of the pivot point, the cable serving to move a relay lever axially into mesh with either an R–1 or a lever directly connected to a separate 2–3 lever, prior to the rotation of the relay lever by the selector lever.

While but one embodiment of the invention has been shown and described, other modifications thereof are possible.

I claim:

1. For use with a manual transmission, a shift control arrangement comprising a rotatable shift tube; a shift shroud secured to the upper portion of said shift tube; a selector lever pivotally mounted on said shift shroud; a shift lever mounted on the lower portion of said shift tube for rotation therewith; first actuator lever means rotatably connected to said transmission for selectively engaging REVERSE or FIRST drive ratios; second actuator lever means rotatably connected to said transmission for selectively engaging SECOND or THIRD drive ratios; a relay lever rotatably and slidably mounted intermediate said first and second actuator lever means; connector means formed on each of said first and second actuator lever means and said relay lever for alternately connecting said relay lever to said first and second actuator lever means depending upon the axial position of said relay lever; resilient means for urging said relay lever into contact with said second actuator lever means for selecting one of said SECOND and THIRD drive ratios upon rotary movement of said selector lever; a bellcrank lever pivotally mounted on said transmission and adaptable to at times contact said relay lever; and a cable interconnected between said bellcrank lever and said selector lever for pivoting said bellcrank lever into contact with said relay lever in response to axial movement of said selector lever in NEUTRAL to axially move said relay lever against the force of said resilient means into contact with said first actuator lever means for selecting one of said REVERSE and FIRST drive ratios upon rotary movement of said selector lever.

2. For use with a manual transmission, a shift control arrangement comprising a rotatable shift tube; a shift shroud secured to the upper portion of said shift tube; a selector lever pivotally mounted on said shift shroud; a shift lever mounted on the lower portion of said shift tube for rotation therewith; first and second actuator lever means rotatably connected to said transmission for selectively respectively engaging REVERSE or FIRST and SECOND or THIRD drive ratios; a relay lever rotatably and slidably mounted intermediate said first and second actuator lever means; connector means formed on each of said first and second actuator lever means and said relay lever for alternately connecting said relay lever to said first and second actuator lever means depending upon the axial position of said relay lever; resilient means for urging said relay lever into contact with one of said first and second actuator lever means for selecting one of said REVERSE-FIRST and said SECOND-THIRD drive ratios upon rotary movement of said selector lever; a bellcrank lever pivotally mounted on said transmission and adaptable to at times contact said relay lever; and a cable interconnected between said bellcrank lever and said selector lever for pivoting said bellcrank lever into contact with said relay lever in response to axial movement of said selector lever in NEUTRAL to axially move said relay lever against the force of said resilient means into contact with the other of said first and second actuator lever means for selecting one of said REVERSE-FIRST and said SECOND-THIRD drive ratios upon rotary movement of said selector lever.

3. For use with a manual transmission, a shift control arrangement comprising a rotatable shift tube, a shift shroud mounted around and secured to the upper portion of said shift tube, a selector lever pivotally mounted on said shift shroud, a shift lever secured for rotation with a lower portion of said shift tube, R–1 and 2–3 levers operatively connected to said transmission, a third lever rotatably mounted adjacent said R–1 lever, a first linkage member interconnecting said third lever and said 2–3 lever, a relay lever rotatably and slidably mounted intermediate said R–1 lever and said third lever, connector means formed on each of said R–1, relay, and third levers for alternately connecting said relay lever to said R–1 and third levers depending upon the axial position of said relay lever, spring means for urging said relay lever into contact with said third lever, a second linkage member interconnecting said relay lever and said shift lever, a bellcrank lever pivotally mounted on said transmission and adapted to at times contact said relay lever, and a cable interconnected between said bellcrank lever and said selector lever for pivoting said bellcrank lever into contact with said relay lever in response to manual pivotal movement of said selector lever to thereby axially move said relay lever against the force of said spring means into contact with said R-1 lever.

4. For use with a manual transmission, a shift control arrangement comprising a rotatable shift tube, a shift shroud mounted around and secured to the upper portion of said shift tube, a selector lever pivotally mounted on said shift shroud, a shift lever secured to a lower portion of said shift tube, an R-1 lever secured to a first shaft extending from said transmission, a 2-3 lever secured to a second shaft extending from said transmission, a third lever rotatably mounted around said first shaft, a first linkage member interconnecting said third lever and said 2-3 lever, a relay lever rotatably and slidably mounted around said first shaft intermediate said R-1 lever and said third lever, connector means formed on each of said R-1, relay, and third levers for alternately connecting said relay lever to said R-1 and third levers depending upon the axial position of said relay lever, spring means for urging said relay lever into contact with said third lever, a second linkage member interconnecting said relay lever and said shift lever, a bellcrank lever pivotally mounted on said transmission and operable for at times contacting said relay lever, and a cable interconnected between said bellcrank lever and said selector lever for pivoting said bellcrank lever into contact with said relay lever in response to manual pivotal movement of said selector lever to axially move said relay lever against the force of said spring means into contact with said R-1 lever.

5. For use with a manual transmission, a shift control arrangement comprising a rotatable shift tube, a shift shroud mounted around and secured to the upper portion of said shift tube, a selector lever pivotally mounted on said shift shroud, a shift lever secured to a lower portion of said shift tube, an R-1 lever secured to a first shaft extending from said transmission, a 2-3 lever secured to a second shaft extending from said transmission, a third lever rotatably mounted around said first shaft, a first lingage member interconnecting said third lever and said 2-3 lever, a relay lever rotatably and slidbly mounted around said first shaft intermediate said R-1 lever and said third lever, a first projection formed on said R-1 lever, a second projection formed on said third lever, a slot formed in said relay lever, said first and second projections and said slot being located at a common radial distance from the axis of said first shaft, spring means for urging said relay lever into contact with said third lever such that said slot of said relay lever meshes with said second projection, a second linkage member interconnecting said relay lever and said shift lever, an opening formed in said third lever, a bellcrank lever pivotally mounted on said transmission and operable for at times contacting said relay lever through said opening, and a cable interconnected between said bellcrank lever and said selector lever for pivoting said bellcrank lever into contact with said relay lever in response to manual pivotal movement of said selector lever to axially move said relay lever against the force of said spring means into contact with said R-1 lever such that said slot of said relay lever meshes with said first projection.

* * * * *